US 11,175,557 B1

(12) United States Patent
Lin et al.

(10) Patent No.: US 11,175,557 B1
(45) Date of Patent: Nov. 16, 2021

(54) TRANSMITTABLE LIGHTING DEVICE

(71) Applicant: NATIONAL SUN YAT-SEN UNIVERSITY, Kaohsiung (TW)

(72) Inventors: Tsung-Hsien Lin, Kaohsiung (TW); Cheng-Chang Li, Kaohsiung (TW); Heng-Yi Tseng, Kaohsiung (TW); Hung-Chang Jau, Kaohsiung (TW); Li-Min Chang, Kaohsiung (TW); Kuan-Wu Lin, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 0 days.

(21) Appl. No.: 16/941,580

(22) Filed: Jul. 29, 2020

(30) Foreign Application Priority Data

Jun. 19, 2020 (TW) .................... 109120832

(51) Int. Cl.
*G02F 1/137* (2006.01)
*G02F 1/1335* (2006.01)
*G02F 1/13357* (2006.01)

(52) U.S. Cl.
CPC ........ *G02F 1/137* (2013.01); *G02F 1/133528* (2013.01); *G02F 1/133615* (2013.01); *G02F 1/13706* (2021.01); *G02F 1/13756* (2021.01); *G02F 1/133531* (2021.01)

(58) Field of Classification Search
CPC ......... G02F 1/133615; G02F 1/133616; G02F 1/1396; G02F 2001/13756
See application file for complete search history.

(56) References Cited

U.S. PATENT DOCUMENTS

| | | | | |
|---|---|---|---|---|
| 5,537,233 A | * | 7/1996 | Miura | G02F 1/1336 349/61 |
| 2015/0338694 A1 | * | 11/2015 | Hamamoto | G02F 1/133615 349/61 |
| 2016/0116768 A1 | * | 4/2016 | Okuyama | G02F 1/133615 349/33 |
| 2019/0302523 A1 | * | 10/2019 | Okuyama | G02F 1/133528 |

FOREIGN PATENT DOCUMENTS

| | | |
|---|---|---|
| CN | 103293747 A | 9/2013 |
| CN | 205983428 U | 2/2017 |
| JP | 2004109787 A | 4/2004 |

* cited by examiner

*Primary Examiner* — Jessica M Merlin
(74) *Attorney, Agent, or Firm* — WPAT, PC

(57) ABSTRACT

A transmittable lighting device is provided. The transmittable lighting device includes two substrates, a transmittable layer, two polarizers and a light source. The two substrates are respectively electrically connected to a voltage supply. A switchable electric field is provided between the two substrates, and two alignment directions of the two substrates are orthogonal to each other. The transmittable layer is located between the two substrates and has a plurality of liquid crystal molecules. Each of the plurality of liquid crystal molecule is arranged along the alignment direction of the substrate nearby, and the plurality of liquid crystal molecules is arranged in a 90-degree twisted arrangement. The two polarizers are located at two outer surfaces of the two substrates, respectively. Each polarizer has a polarization direction parallel to the alignment direction of the substrate on the same outer surface. The light source emits a lateral light entering the transmittable layer laterally.

9 Claims, 7 Drawing Sheets

TRANSMITTABLE LIGHTING DEVICE

CROSS REFERENCE TO RELATED APPLICATION

The application claims the benefit of Taiwan application serial No. 109120832, filed on Jun. 19, 2020, and the entire contents of which are incorporated herein by reference.

BACKGROUND OF THE INVENTION

1. Field of the Invention

The present invention relates to an optical-electric component and, more particularly, to a transmittable lighting device for selectively allowing the transmission of ambient/background light or showing illuminated images.

2. Description of the Related Art

With the development of consumer electronic products such as notebook computers, mobile phones, wearable devices, etc., display devices have further developed thinner and more flexible display panels, besides improving the image performance of resolution, color, contrast, and viewing angle. In addition, a transmittable lighting device that makes objects behind the panel visible and displays images at the same time can be applied to the windshield of the vehicle, so that the driver can pay attention to the road conditions and also obtain vehicle information from the images. Alternatively, the transmittable lighting device can be applied to the building glass. In addition to providing the original light transmitting functions, it has further provided advertisements or instant messages functions outwards.

However, the conventional transmittable lighting device has worse effect of seeing rear objects due to the lower transparency of the panel relative to ordinary glass. In addition, the image projected on the panel is interfered by the penetrating ambient light, resulting in deterioration of the image quality. Please refer to FIG. 1, which showing a conventional transmittable lighting device 9, a linearly polarized light P is generated by filtering a light emitted from a lateral light source 92 with a polarizer. A light guiding plate 93 then changes the propagation direction of the linearly polarized light P to enter a liquid crystal panel 94, so that the linearly polarized light P is provided as the backlight of the liquid crystal panel 94 to display images. In addition, a natural light N can sequentially pass through the light guiding plate 93 and the liquid crystal panel 94, so that a user can see the natural light N behind the liquid crystal panel 94 while seeing the image displayed on the liquid crystal panel 94 at the same time. However, the linearly polarized light P emitted from the lateral light source 92 successively passes through the polarizer 91 and the light guiding plate 93, resulting gradually decreased light intensity and lowered light utilization rate. Furthermore, the conventional transmittable lighting device 9 requires the polarizer 91 and the light guide 93 be integrated into the liquid crystal panel 94, thereby increasing the difficulty and cost of the product manufacture.

Based on the above, it is necessary to improve the conventional transmittable lighting device.

SUMMARY OF THE INVENTION

To solve the problems mentioned above, an objective of the present invention is to provide a transmittable lighting device which can display images and prevent from being interfered by the penetrating ambient light.

It is another objective of the present invention to provide a transmittable lighting device which can utilize the liquid crystal structure for switching the lighting display state and thereby omits additional optical compensation components.

It is yet another purpose of the present invention to provide a transmittable lighting device which can prevent the light intensity of the optical component from decreasing so as to raise light utilization rate.

As used herein, the term "a", "an", or "one" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

As used herein, the term "coupling", "engagement", "assembly", and similar terms are used to include separation of connected members without destroying the members after connection or inseparable connection of the members after connection. A person having ordinary skill in the art would be able to select according to desired demands in the material or assembly of the members to be connected.

A transmittable lighting device of the present invention includes two substrates, a transmittable layer, two polarizers and a light source. The two substrates are respectively electrically connected to a voltage supply. An electric field which is switchable is provided between the two substrates, and two alignment directions of the two substrates are orthogonal to each other. The transmittable layer is located between the two substrates and has a plurality of liquid crystal molecules. Each of the plurality of liquid crystal molecule is arranged along the alignment direction of the substrate nearby, and the plurality of liquid crystal molecules is arranged in a 90-degree twisted arrangement. The two polarizers are located at two outer surfaces of the two substrates, respectively. Each polarizer has a polarization direction parallel to the alignment direction of the substrate on the same outer surface. An ambient light passes through one of the polarizers and the plurality of liquid crystal molecules in a 90-degree twisted arrangement so as to be polarized by 90 degrees, and passes through the polarizer on the other outer surface. Thereby, the transmittable lighting device is switch to a transmittable state. The light source emits a lateral light entering the transmittable layer laterally. When the electric field is provided between the two substrates, the plurality of liquid crystal molecules is chaotically arranged, and the lateral light is scattered by the plurality of liquid crystal molecules. An incident angle of the lateral light is changed and the lateral light passes through the substrates and the polarizer. Thereby, the transmittable lighting device is switched to a lighting state.

Accordingly, the transmittable lighting device of the present invention can be switched between a transmittable state and a lighting state by switching the arrangement of the plurality of liquid crystal molecules to adjust the transmissions of the ambient light and the lateral light. The background interference can be avoided when the transmittable lighting device displays images, and optical components such as light valves, light guide plates or compensation films are not necessary. It may provide the effects of "improved light utilization", "simplified structure" and "easily switching control".

In an embodiment, when the electric field is provided between the two substrates, the ambient light passes through one of the polarizer to be polarized, passes through the plurality of liquid crystal molecules in chaotic arrangement to be scattered, and is blocked by the polarizer on the other outer surface. Thereby, the transmittable lighting device is switched to a light-shielding state. As such, the ambient light scattering can reduce polarization rotation and light transmittance, ensuring the effect of reducing brightness and eliminating background images.

In an embodiment, when the electric field is not provided between the two substrates, the lateral light has no interaction with the plurality of liquid crystal molecules arranged in the 90-degree twisted arrangement. The lateral light is totally reflected on interfaces of each of the two substrates. The lateral light is transmitted in the two substrates and the transmittable layer only. Thereby, the lateral light does not affect the transmittable state. As such, the lateral light is not emitted in the same direction as the ambient light, ensuring the effect of enhancing the perspective of viewing the background image.

In an embodiment, the plurality of liquid crystal molecules is a plurality of positive liquid crystals molecules. As such, the plurality of liquid crystal molecules tends to be aligned in parallel with the direction of the electric field, ensuring the effect of switching the liquid crystal arrangement.

In an embodiment, the light source is a natural light source. As such, the ambient light source can be converted into the light source or the backlight source, ensuring the effect of saving energy.

In an embodiment, the light source is a light emitting diode, a laser, or a halogen lamp. As such, a stable and switchable light source can be provided, ensuring the effect of improving image quality and display control.

In an embodiment, the light source is disposed on the substrate. As such, there is no need to guide in additional light and adjust the angle of incidence, ensuring the effect of improving the convenience of use.

In an embodiment, the light source emits the lateral light from one side of the transmittable layer. As such, the transmission path of the lateral light is consistent to reduce the light divergence and interference, ensuring the effect of improving the uniformity of light emission.

In an embodiment, the light source emits the lateral light from multiple sides of the transmittable layer. As such, the overall intensity of the lateral light is increased, ensuring the effect of improving the luminous brightness and image contrast.

In the various figures of the drawings, the same numerals designate the same or similar parts. Furthermore, when the terms "up (top)", "low (bottom)", "inner", "outer", "lateral", and similar terms are used herein, it should be understood that these terms have reference only to the structure shown in the drawings as it would appear to a person viewing the drawings and are utilized only to facilitate describing the invention, rather than restricting the invention.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE INVENTION

Figure 1:
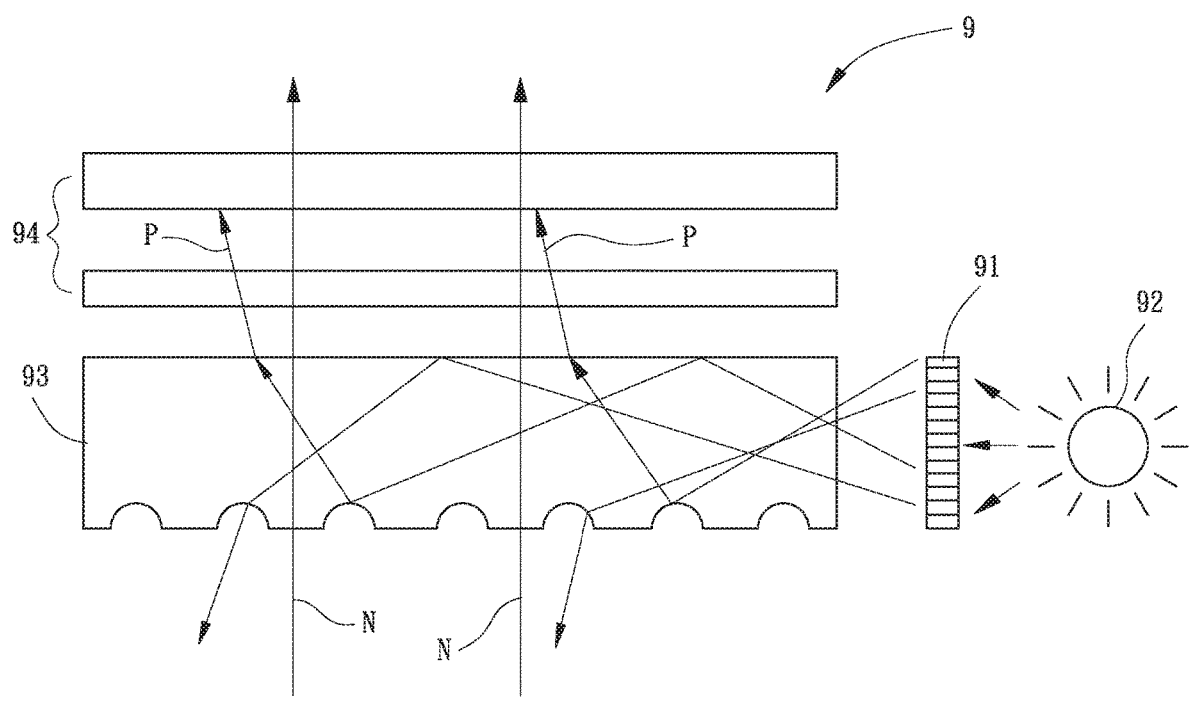
FIG. 1 is a schematic diagram showing a conventional transmittable lighting device in use.
Figure 2:
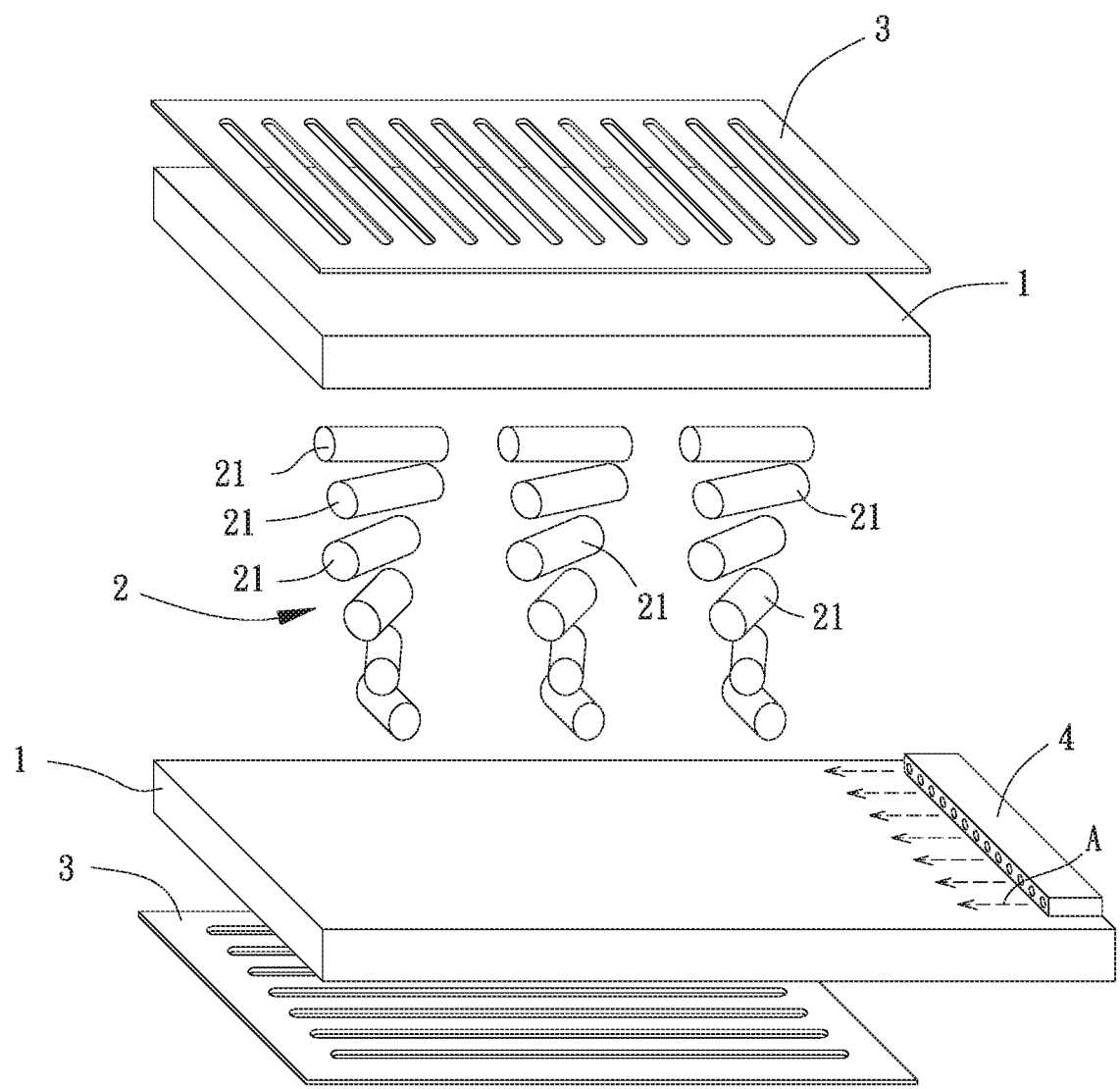
FIG. 2 is an exploded, perspective view of a preferred embodiment of the present invention.

Referring to FIG. 2, a transmittable lighting device of a preferred embodiment of the present invention includes two substrates 1, a transmittable layer 2, two polarizers 3, and a light source 4. The transmittable layer 2 is between the two substrates 1. The two polarizers 3 are located at two outer surfaces of the two substrates 1, respectively. The light source 4 is configured to emit a light that laterally enters the transmittable layer 2 from a side edge of the transmittable layer 2 and thereby define a(an) lateral/adjustable light A.

Figure 3B:
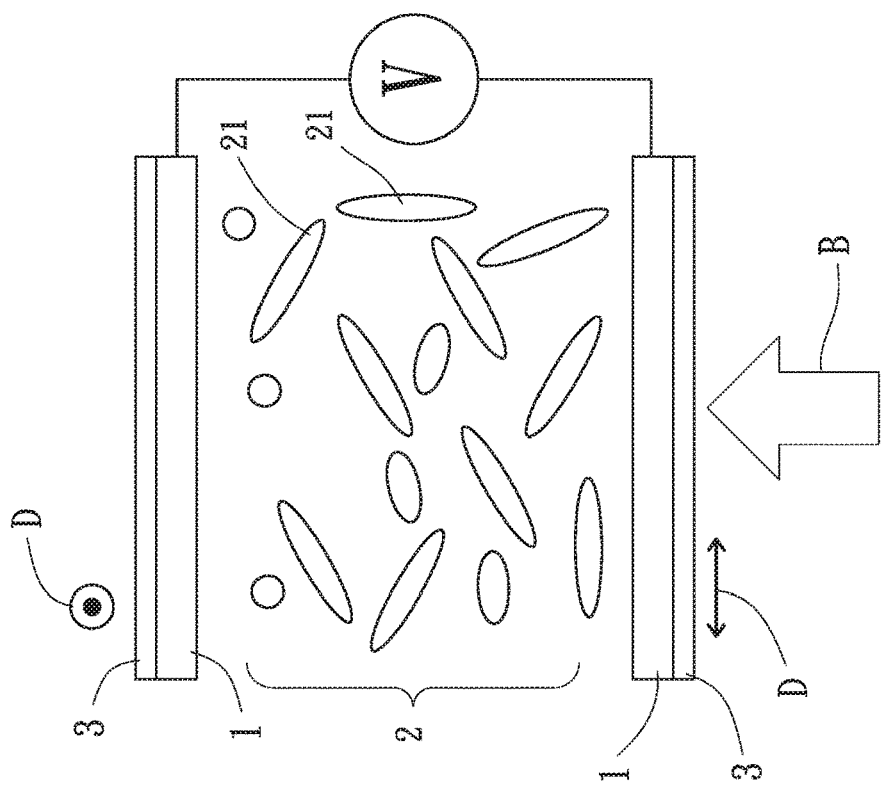
FIG. 3b is a schematic diagram of a preferred embodiment of the present invention in a light-shielding state.
Figure 3A:
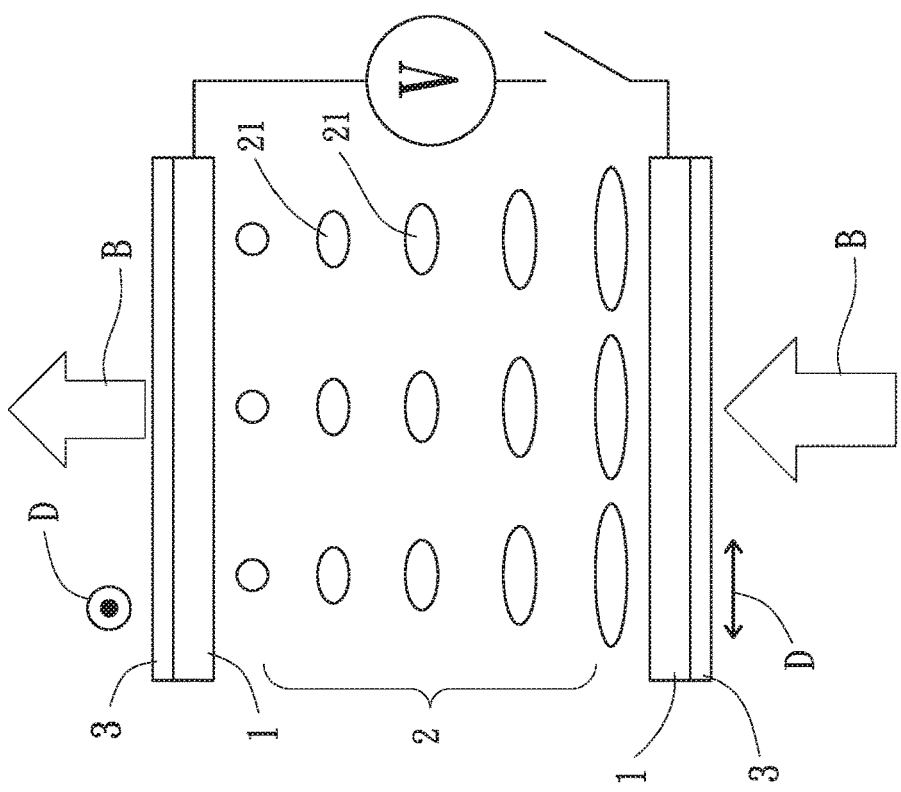
FIG. 3a is a schematic diagram of a preferred embodiment of the present invention in a transmittable state.

Referring to FIGS. 2, 3a, and 3b, the two substrates 1 are respectively electrically connected to a voltage supply, thus a switchable electric field can be formed between the two substrates 1. In addition, each substrate 1 has an alignment characteristic, and the two alignment directions D of the two substrates 1 are orthogonal to each other. Preferably, the two substrates 1 include transparent composite materials, so that light can pass through the two substrates 1. The composite material of each substrate 1 may include a hermetic material, transparent conductive material and a polyimide (PI) film. The hermetic material can be glass, acrylic, plastic, etc., for confining the fluid substance between the two substrates 1. The transparent conductive material can be indium tin oxide (ITO), nanosilver wire, transparent conductive metal, etc., which are used as the two electrodes at both ends of the electric field between the two substrates 1. The polyimide film provides alignment effect by forming several alignment grooves on a surface thereof.

The upper and lower surfaces of the transmittable layer 2 are respectively attached to the two substrates 1, making the transmittable layer 2 subjected to the alignment direction D of the two substrates 1 and the electric field, so as to change the arrangement of a plurality of liquid crystal molecules 21. As shown in FIG. 3a. When the two substrates 1 are not connected to the voltage supply, the plurality of liquid crystal molecules 21 are only subjected to the alignment effect, and each of the plurality of liquid crystal molecule 21 is arranged along the alignment direction D of the substrate 1 nearby. Since the two alignment directions D are orthogonal to each other, the plurality of liquid crystal molecules 21 shows a 90-degree twisted arrangement from top to bottom. In addition, as shown in FIG. 3b, the plurality of liquid crystal molecules 21 may be positive liquid crystal molecules. When the electric field is formed between the two substrates 1, each of the plurality of liquid crystal molecule 21 tends to be aligned parallel to the electric field, but the alignment effect also affects the arrangement of each of the plurality of liquid crystal molecule 21, resulting in a chaotic arrangement of the plurality of liquid crystal molecules 21.

The two polarizers 3 are located at two outer surfaces of the two substrates 1, respectively, so that an ambient light B passes through the two polarizers 3 respectively from the input end to the output end of the transmittable lighting device. Each polarization board 3 has a polarization direction parallel to the alignment direction D of the substrate 1 on the same outer surface, so that the polarization directions of the two polarizers 3 are orthogonal to each other and differ by 90 degrees. As shown in FIG. 3a. The ambient light B passes through one of the polarization boards 3 to be polarized, and continues to pass through the transmittable layer 2 to have the polarization state be rotated by 90 degrees by the twisted liquid crystal molecules 21. Thus, the ambient light B can pass through the polarizer 3 on the other outer surface. The transmittable lighting device that the ambient light B has passed through is in a transmittable state. In addition, as shown in FIG. 3b, the ambient light B passes through one of the polarization boards 3 to be polarized, and continues to pass through the plurality of liquid crystal molecules chaotically arranged in the transmittable layer 2 to be randomly scattered without having polarized rotation. Then, most of the ambient light B is blocked by the polarization board 3 on the other outer surface so that the brightness of the ambient light B passed through is reduced, and the scattering effect of the transmittable layer 2 may also blur the image of the ambient light B. Thus, the transmittable lighting device is in a light-shielding state.

Figure 4A:
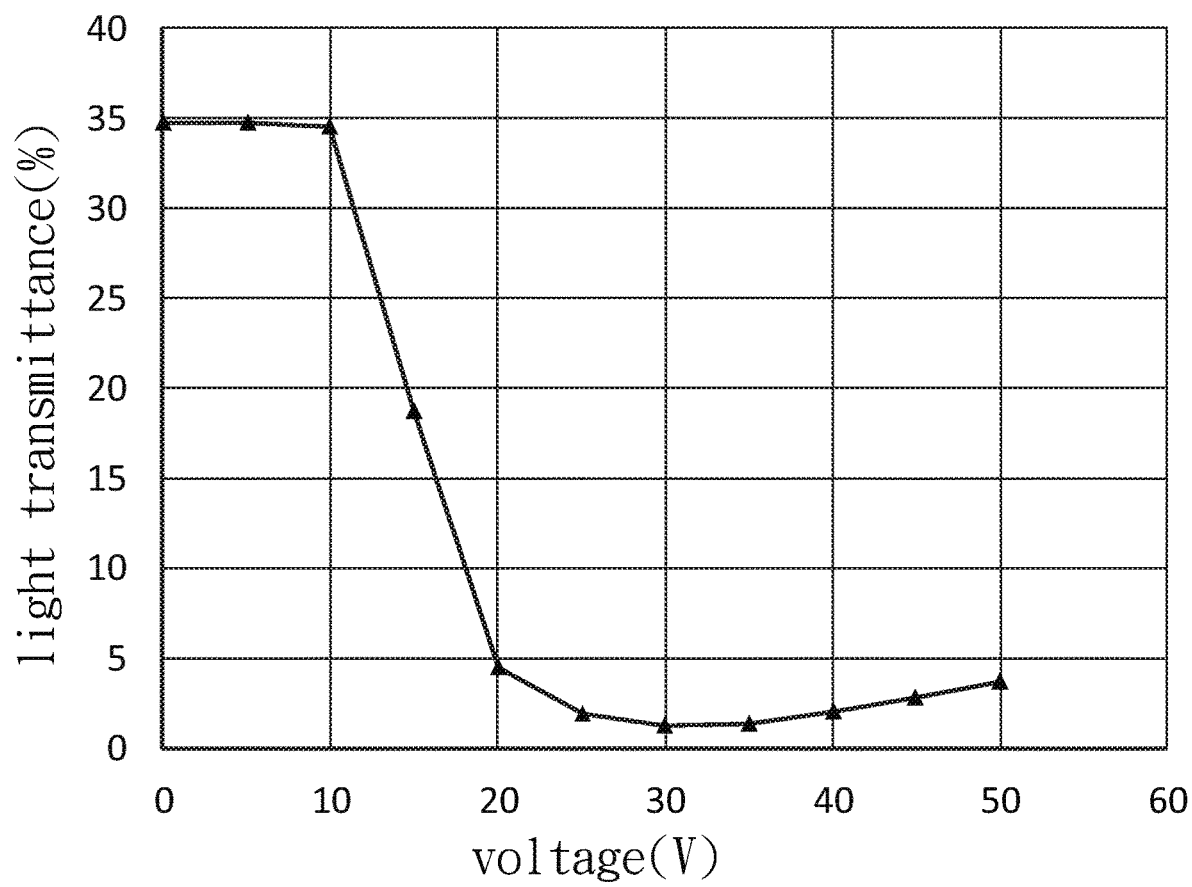
FIG. 4a schematically shows the relationship between the ambient light transmittance and the applied voltage of a preferred embodiment of the present invention.
Figure 4B:
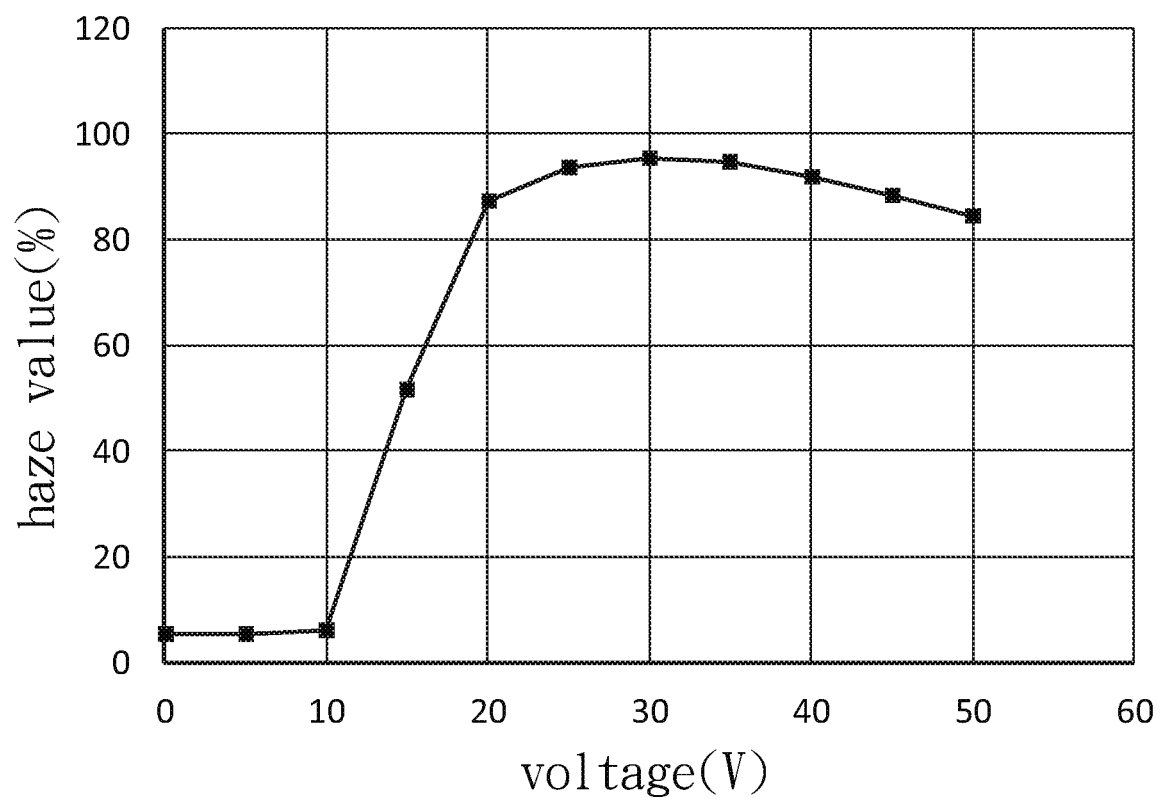
FIG. 4b schematically shows the relationship between the haze value and the applied voltage of a preferred embodiment of the present invention.

Referring to FIGS. 4a and 4b again, which shows the relationships between the light transmittance and haze value and the applied voltage as the ambient light B passing through the transmittable lighting device in FIGS. 3a and 3b. When the voltage between the two substrates 1 is lower than 10 volts, the electric field applied on the transmittable layer 2 is insufficient to affect the arrangement of the plurality of liquid crystal molecules 21. As such, the transmittable lighting device has the highest light transmittance and can be used as a general transparent glass. As the voltage between the two substrates 1 gradually increases, the disorder of the arrangement of the plurality of liquid crystal molecules 21 gradually increases. The ambient light B reduces the polarized rotation to lower the light transmittance, and increases random scattering to raise the haze value. When the voltage between the two substrates 1 is greater than 20 volts, the transmittable lighting device has a light transmittance less than 5% and a haze value higher than 80%, so as to reduce the brightness and eliminate background images, and further used for image projection with the image quality not affected by the ambient light B.

Referring to FIG. 2, the light source 4 emits the lateral light A laterally entering the transmittable layer 2. The lateral light A may be reflected and refracted at the interfaces between the transmittable layer 2 and each substrate 1, or at the interfaces between each substrate 1 and the air. Further, the lateral light A may interact with the plurality of liquid crystal molecules 21 to be scattered. In this embodiment, the light source 4 is a light emitting diode array fabricated on a single side of the substrate 1. However, the light source 4 may also be natural light source or other lighting structures, such as lasers, halogen lamps, etc., and the lateral light A emitted from the light source 4 may enter the transmittable layer 2 from a single side or multiple sides, which is not limited in the present invention.

Figure 5A:
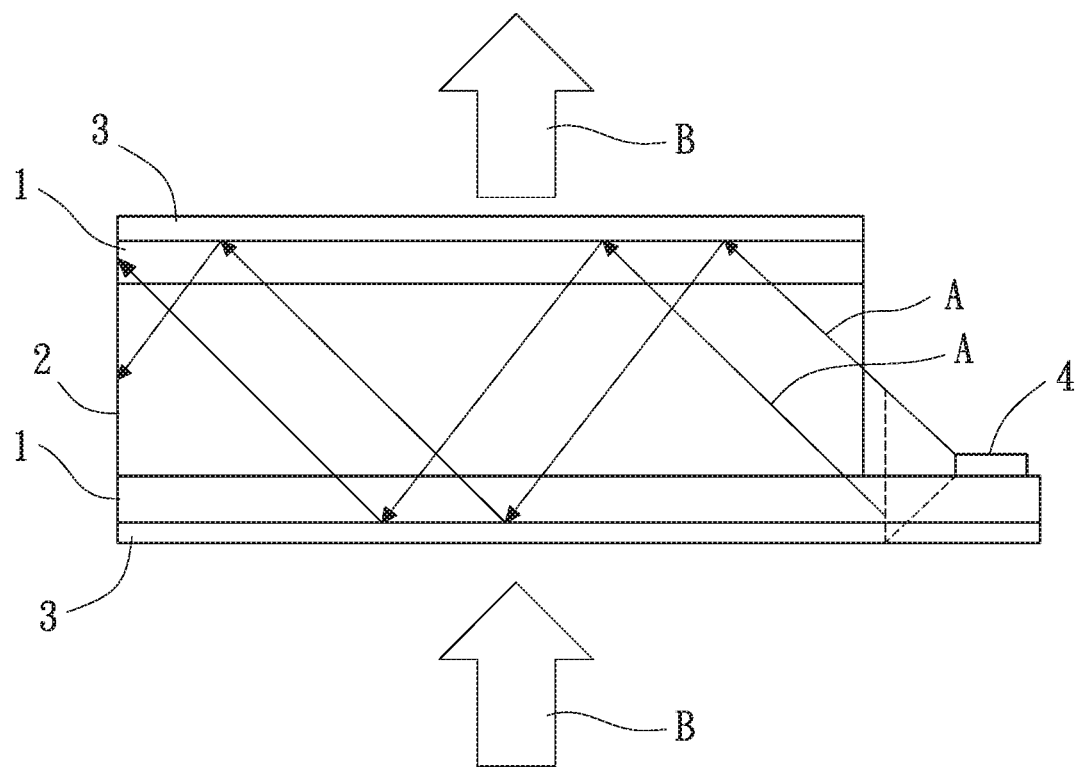
FIG. 5a is a schematic diagram showing the lateral light transmission of a preferred embodiment of the present invention in a transmittable state.
Figure 5B:
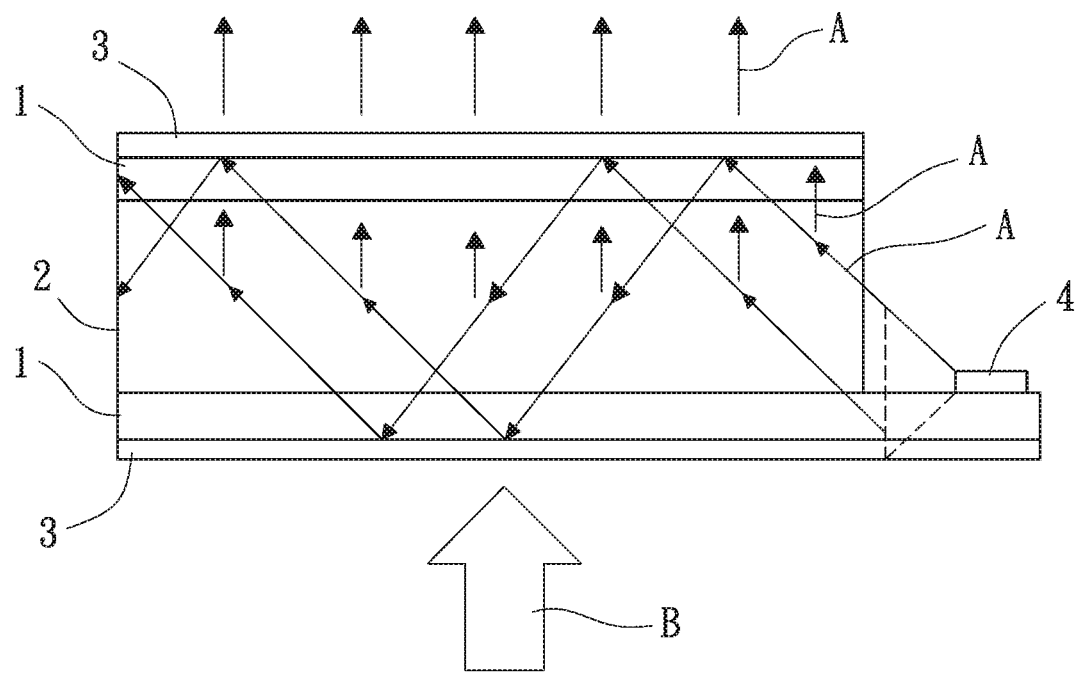
FIG. 5b is a schematic diagram showing the lateral light transmission of a preferred embodiment of the present invention in a lighting state.

Referring to FIGS. 5a and 5b, which respectively show the transmittable state and the light-shielding state of the transmittable lighting device lighted by the lateral light A. As shown in FIG. 5a, the ambient light B passes through the two substrates 1, the transmittable layer 2 and the two polarizers 3. The lateral light A is totally reflected at the interfaces of each substrate 1 and not interacting with the transmittable layer 2, resulting the lateral light A only propagating in the two substrates 1 and the transmittable layer 2 instead of reaching to the outside of the transmittable lighting device. The user can only see the background images from the ambient light B. Whether the lateral light A is emitted into the transmittable lighting device, the transmittable state of the transmittable lighting device is not changed. As shown in FIG. 5b, the ambient light B is scattered by the transmittable layer 2 and blocked by the polarizer 3. The lateral light A is scattered by the transmittable layer 2, so that a portion of the lateral light A has incident angles greater than the total reflection angle at the interface of the substrate 1, and thus is able to pass through the substrate 1. Besides, the lateral light A is not polarized by one of the polarizers 3, and is thus capable of reaching to the outside of the transmittable lighting device through the other polarizer 3. The user can see the illumination of the lateral light A without being affected by the ambient light B. By guiding in the lateral light A, the transmittable lighting device can be switched from the light-shielding state to the lighting state.

Figure 6:
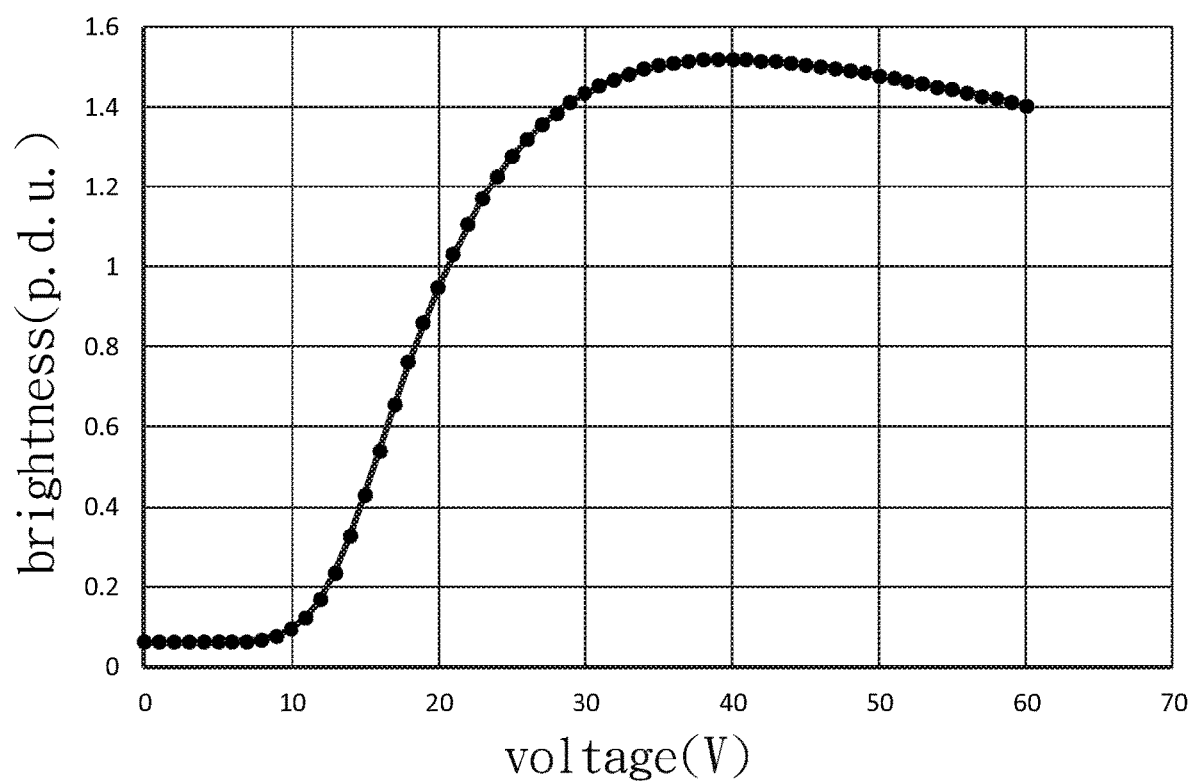
FIG. 6 schematically shows the relationship between the light intensity of the lateral light and the applied voltage of a preferred embodiment of the present invention.

Referring to FIG. 6 again, which shows the relationship between the brightness and the voltage effect of the lateral light A in FIGS. 5a and 5b. The transparency and brightness of the transmittable lighting device can be adjusted by controlling the voltage and making the lateral light A and the ambient light B not interfering with each other. In addition, the voltage can be partially applied to the transmittable layer 2, so that the designated area has a transmittable or adjustable lighting effect. The emitted lateral light A can also be converted into light of various colors by a color filter. Therefore, the transmittable lighting device is capable of showing images, and being applied to a transmittable display with both functions of seeing-through and projecting image.

Based on the above, the transmittable lighting device of the present invention can be switched between a transmittable state, a light-shielding state and a lighting state by switching the arrangement of the plurality of liquid crystal molecules to adjust the transmissions of the ambient light and the lateral light. The ambient/background interference can be avoided when the transmittable lighting device displays images, while optical components such as light valves, light guide plates or compensation films are not necessary. It may provide the effects of "improved light utilization", "simplified structure" and "easily switching control".

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A light-transmittable lighting device, comprising:
   two substrates respectively electrically connected to a voltage supply, wherein an electric field which is switchable is provided between the two substrates, and wherein two alignment directions of the two substrates are orthogonal to each other;

a light-transmittable layer located between the two substrates and having a plurality of liquid crystal molecules, wherein each of the plurality of liquid crystal molecule is arranged along the alignment direction of the substrate nearby due to an alignment effect of the two substrates, and wherein the plurality of liquid crystal molecules is arranged in a 90-degree twisted arrangement;

two polarizers located at two outer surfaces of the two substrates, respectively, wherein each polarizer has a polarization direction parallel to the alignment direction of the substrate on the same outer surface; and a light source for emitting a lateral light laterally entering the light-transmittable layer, wherein in a first state that no electric field is provided between the two substrates, an ambient light enters into the light-transmittable layer via one of the two polarizers, the ambient light undergoes a polarized rotation by the plurality of liquid crystal molecule in the 90-degree twisted arrangement, and then exits out via the other one of the two polarizers; and wherein in a second state that the electric field between the two substrates is generated by applying a voltage not greater than a Freedericksz transition threshold for rotating the plurality of liquid crystal molecules between the two substrates, the plurality of liquid crystal molecules forms an arrangement influenced by the electric field and the alignment effect, the lateral light is scattered by the arrangement of the plurality of liquid crystal molecules, an incident angle of the lateral light is changed, and the lateral light passes through one of the two substrates and a respective one of the two polarizers.

2. The light-transmittable lighting device as claimed in claim 1, wherein in the second state, one of the two polarizers is configured to have the ambient light passing therethrough into the light-transmittable layer, and then the ambient light is scattered by the plurality of liquid crystal molecules in arrangement, and is blocked by the polarizer on the other outer surface.

3. The light-transmittable lighting device as claimed in claim 1, wherein in the first state, the lateral light has no interaction with the plurality of liquid crystal molecules in the 90-degree twisted arrangement, and is totally reflected on interfaces of each of the two substrates, and wherein the lateral light is transmitted in the two substrates and the light-transmittable layer only.

4. The light-transmittable lighting device as claimed in claim 1, wherein the plurality of liquid crystal molecules is a plurality of positive liquid crystal molecules.

5. The light-transmittable lighting device as claimed in claim 1, wherein the light source is a natural light source.

6. The light-transmittable lighting device as claimed in claim 1, wherein the light source is a light emitting diode, a laser, or a halogen lamp.

7. The light-transmittable lighting device as claimed in claim 1, wherein the light source is disposed on the one of the two substrates.

8. The light-transmittable lighting device as claimed in claim 1, wherein the light source emits the lateral light from one side of the light-transmittable layer.

9. The light-transmittable lighting device as claimed in claim 1, wherein the light source emits the lateral light from multiple sides of the light-transmittable layer.

* * * * *